June 6, 1939. C. A. RAYMOND 2,160,902
METHOD OF MANUFACTURING FOOD PRODUCT
Filed June 8, 1937

Inventor
CHARLES A. RAYMOND,
By Kimmel & Crowell
Attorneys.

Patented June 6, 1939

2,160,902

UNITED STATES PATENT OFFICE 2,160,902

METHOD OF MANUFACTURING FOOD PRODUCT

Charles A. Raymond, Marion, Ohio

Application June 8, 1937, Serial No. 147,135

5 Claims. (Cl. 99—86)

This invention relates to a food product and method of manufacturing it.

The invention has for its object to provide, in a manner as hereinafter set forth, a toasted, crisp, nutritious, delicate, desirable and tasty food product having a vegetable base.

The product consists of a toasted body of the desired length formed from a series of constituents combined into a heterogeneous mass of substantially ribbed ribbon-like form.

The constituents of the mass will consist of potato, (Irish or sweet, preferably Irish), salt, granulated sugar, shortening (vegetable or animal, preferably vegetable), leavening (preferably ammonium bicarbonate), flour (vegetable or cereal, preferably spring wheat flour having a high starch content), beaten egg white or albumen (or equivalent in dry egg white). A suitable flavoring agent may be added. If desired, the mass may consist of potato, salt, sugar, shortening, leavening, flour and egg white, as stated, combined with cheese. The constituents of the mass may be of any suitable proportions as desired, however, the preferred proportions of the constituents will be referred to.

As to the preferred proportions of the constituents of the mass: they are 3½ ounces of potato, ½ level teaspoon of salt, one level teaspoon of sugar, one level tablespoon of shortening, leavening, approximately ½ teaspoonful, one ounce of flour and two level teaspoons (more or less) of beaten egg white or the equivalent thereof in dry egg powder. The proportions just referred to do not constitute a fixed standard of proportions, but are subject to variations as desired. When the mass is to contain cheese, one-half ounce (more or less) of the latter is employed. The potatoes gradually lose some of their water content and therefore some liquid, such as water or milk must be added to the mass whenever the potato has lost sufficient moisture to require it.

All amounts in this formula are variable as desired because there is a difference in potatoes and different makes of the same kinds of materials which require more or less for the same results as those given in the formula.

The potato is boiled, steam or baked, preferably boiled or steamed until properly cooked. The boiling is discontinued at the point when the potato is about to take up the water. The cooked potato is then acted upon to bring it to what may be termed a sticky taffy-like or taffied condition capable of being pulled. Such state will be termed a taffied state. The most ideal time, (with power equipment), to bring the potato to the desired condition is immediately after cooking. By hand processing, it is found that small grained potatoes process quicker in one-half to one hour after cooking, their natural cooling time.

After the potato has been brought to a taffied state the salt, sugar, shortening, egg white and leavening are combined therewith, then the flour is added and the constituents thoroughly mixed together to form a heterogeneous mass of dough-like form.

The dough is then pressed into what may be termed a ribbon-like body formed of a core having lengthwise extending radially disposed ribs. The core may or may not be hollow from end to end. Preferably, it is solid and is so shown. The body is then severed into strips of the desired length. The strips are then toasted or baked resulting in a distorted ribbed product having its body of irregular curved contour or a distorted ribbed product having its body straight.

The product is illustrated by way of example as of the distorted ribbed type having its body of irregular curved contour.

The beating treatment of the cooked potatoes not only breaks down the starch cells to free the starch grains, and make the potatoes more nutritious but also thoroughly aerates the mass, which tends to make it light and contributes to the production of the nutty flavor in the finished product.

Figure 4:
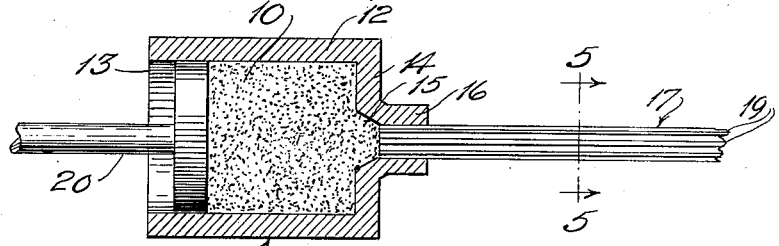
Figure 4 is a longitudinal sectional view of a former device for the dough and illustrating the action of the device on the dough.
Figure 5:
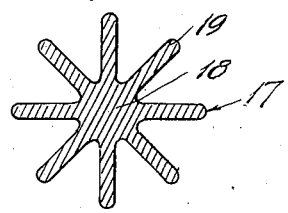
Figure 5 is a section on line 5—5, Figure 4, upon an enlarged scale.

The dough formed by the heterogeneous mass is indicated at 10 and is shown positioned in a former device 11. The latter consists of a cylinder 12 open completely at its end 13. The cylinder 12 includes a head 14 formed axially thereof with a tapered opening 15 which opens into a tubular die or former 16 extending outwardly from head 15. The die 16 is of a type which has its inner face formed with alternately disposed grooves and ribs to provide the dough, when expelled from cylinder 12, to be substantially in the form of a ribbon 17 comprising a core 18 having extended therefrom radially disposed ribs 19 of like form. The rear end of the dough 10 within the cylinder 12 is engaged by a slidable expeller element 20 which acts, in connection with the die 16, to force the dough from the cylinder in the form shown in Figures 4, 5.

Figure 1:
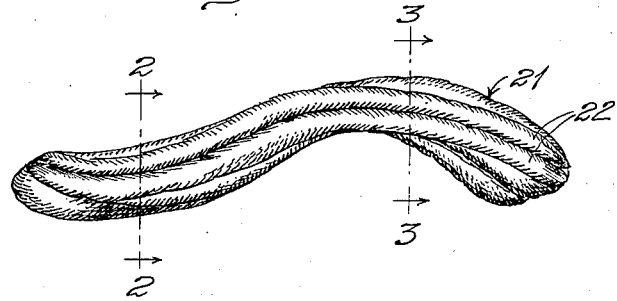
Figure 1 is a perspective view of the product.
Figures 2, 3:
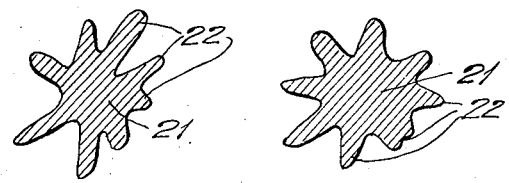
Figure 2 is a section on line 2—2, Figure 1.
Figure 3 is a section on line 3—3, Figure 1.

The ribbon 17 is severed in pieces or strips of the desired length. The strips are toasted or baked to provide a regular or irregular shaped ribbed or plain body. The product as shown is of an irregular curved ribbed body and with reference to Figures 1, 2 and 3, body 21 of the product is of irregular curved shape formed lengthwise thereof with irregular shaped or distorted ribs 22.

The potato, after it is cooked, is given a severe lengthy beating or whipping which forms it into a sticky or gummy-like taffy condition capable of being pulled like taffy candy. The cooked potato in such condition is then subjected to a pulling action until it becomes of a very fine, uniform consistency, appearing almost similar to white taffy. It has a smooth glossy surface, somewhat spongy and jellified in consistency and is quite adhesive or gummy.

Potatoes are constructed of small cells made of a fibrous substance. These fibrous cells contain starch. All of these cells are not broken by cooking therefore the starch grains therein are not freed. When these unbroken cells reach the stomach, the starch they contain cannot be digested as the stomach juices have no effect on the non-broken fiber cells, but in the present processed potato all such cells are broken open and the starch freed. After cooking a powerful frictional beating breaks up these closed fibrous cells, freeing the starch. This action is also aided by the pulling process, made possible by the adhesive qualities of the starch, similar in action to the pulling of taffy. This also helps to reduce these fibers to very fine particles. It has been found that the fibers surrounding the starch are not digestible by stomach juices so it is evident that in the applicant's process the thorough breaking up of these fibrous cells freeing the starch makes the product more highly nutritious. The product in accordance with this invention provides for increased nutrition and digestability.

The manner of treating the potato will cause decreases in the shrinkage when the dough is baked. Owing to the release of starch and the breaking up to maximum fineness these fibers, there is obtained a finer, more porous, delicate, desirable and tasty product. It holds its form better owing to the sticky or gummy-like taffy consistency of the potatoes and it toasts in less time.

Steam cooked potatoes process into a heavier, more sticky, gummy mass than when boiled and can be used more successfully in making the potato product without any flour.

After the potato has been mashed, whipped and pulled into the desired taffied and fine condition, any size piece of this mass is taken and dropped in a cup of water and floats, about one-half extending above the surface of the water. This is unquestionable proof that in the conditioning of these potatoes, they are filled with air or aerated. This is of great value to the finished product. As soon as this air is subjected to the heat in the oven, it expands increasing the porosity of the product and thereby adding to the delicacy of the texture and increasing the size of the product. It also aids the quick action expansion of the ammonium bicarbonate and together they produce a product of super porosity which not only makes for maximum delicacy of texture and size, but hastens production and adds greatly to the keeping quality of the product on account of this super porosity allowing complete toasting throughout and the driving out of all moisture therein.

What I claim is:

1. The method of manufacturing a crispy food product having a potato base which includes severely beating cooked potato until the mass attains a taffied or gummy state, mixing salt, a chemical leavening and albumen to the taffied or gummy mass, adding sufficient flour to the mass to produce a dough-like mass, forming the material into such shape that the material will thoroughly cook, and finally toasting the material until it is crisp.

2. The method of manufacturing a crispy food product having a potato base which includes severely beating 3½ ounces of cooked potato until the mass attains a taffied or gummy condition, adding the following ingredients in substantially the following proportions: ½ level teaspoon of salt, 1 level teaspoon of sugar, 1 level tablespoon of shortening, ½ teaspoon leavening, 2 level teaspoons beaten egg white, and 1 ounce flour, forming the material into articles of small thickness and cooking the articles until they are crisp.

3. The method of manufacturing a crispy food product as set forth in claim 1 wherein a liquid is added to assist in obtaining a dough-like mass.

4. The method of manufacturing a crispy food product having a potato base which includes severely beating cooked potato until the mass attains a taffied or gummy state, mixing salt, a chemical leavening and albumen to the taffied or gummy mass, adding sufficient flour to the mass to produce a dough-like mass, forming the material into articles of small thickness, and finally toasting the articles until they are crisp.

5. The method of processing potato for use as a base in the manufacture of crispy food products comprising cooking the potato, giving it a severe lengthy beating or whipping until it forms a sticky or gummy-like mass, and subjecting the mass to a pulling action until it becomes of a smooth taffy-like consistency.

CHARLES A. RAYMOND.